April 17, 1956 W. E. KELLY 2,742,243

REEL THREADER

Filed Dec. 17, 1952

INVENTOR.

William E. Kelly

BY Victor J. Evans & Co.

ATTORNEYS

United States Patent Office 2,742,243
Patented Apr. 17, 1956

2,742,243

REEL THREADER

William E. Kelly, Dayton, Ohio

Application December 17, 1952, Serial No. 326,384

2 Claims. (Cl. 242—107)

This invention relates to devices for facilitating threading tape or film on reels or spools such as of a magnetic recorder or amateur or professional moving picture machine, and in particular a reel having a hub or drum with an auxiliary spring actuated spool journaled on the spindle of the reel and having a tape with a fastening element thereon whereby the fastening element is adapted to be withdrawn, connected to the end of a tape or film and which when released, draws the end of the tape or film against the drum of the reel.

The purpose of this invention is to facilitate threading tape or film through reels or spools and, particularly, on a winding reel of a camera or projector.

With the conventional recorder, camera or projector, where the drum or cylindrical section of a reel is of a comparatively small diameter and the flanges relatively large, it is difficult to attach the end of a tape or film to the reel. With this thought in mind this invention contemplates a small tape on a spring actuated spool positioned within the hub or drum of a reel whereby the small tape is withdrawn, fastened to the end of a tape or film and released to draw the tape or film to a starting position upon the reel.

The object of this invention is, therefore, to provide means for attaching the end of a tape or film to a reel wherein the attaching means is adapted to be withdrawn to facilitate connecting the end thereof to a tape or film.

Another object of the invention is to provide a reel threading device that is adapted to be incorporated in reels without changing the size of the reel.

A further object of the invention is to provide a tape or film reel having an auxiliary spool with a connecting tape thereon in the drum or hub thereof in which the reel is of a simple and economical construction.

With these and other objects and advantages in view the invention embodies a reel having a drum positioned between flanges with transversely disposed slots in the drum and with an auxiliary spring actuated spool incorporated in the drum and having a tape with fastening means on an extended end thereof positioned on the spool.

Other features and advantages of the invention will appear from the following description taken in connection with the drawing, wherein.

Figure 2:
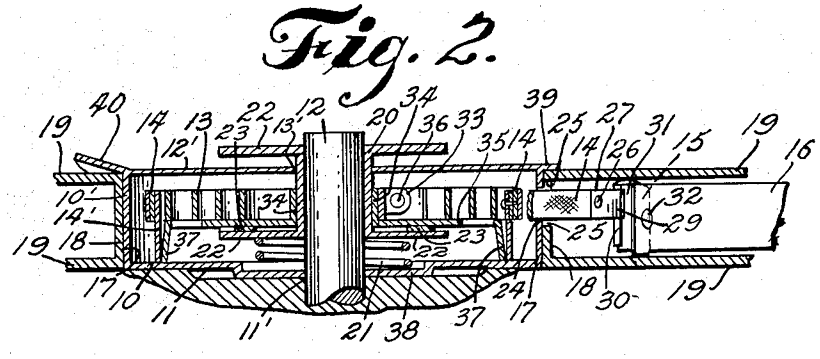
Figure 2 is a cross section through the hub of a reel showing the reel mounted on a spindle and illustrating an end of a tape or film extended into the reel and connected to a tape extended from the auxiliary spool in the hub of the reel.

Referring now to the drawing wherein like reference characters denote corresponding parts the improved reel of this invention includes an auxiliary spool 10 having a cylindrical peripheral wall 10' with a lower circular wall 11 which by means of a central opening 11' the spool is journaled on a spindle 12, the spool 10 is also provided with an upper circular wall 12' which is provided with a central opening 13' and an intermediate cylindrical wall 14', a spiral spring 13 is mounted on the wall 14' and positioned in the spool 10, a tape 14 positioned on the wall 14' and having a fastener 15 on the extended end for temporarily attaching the tape to a tape or film 16, a drum 17 having a sleeve 18 mounted on the outer surface of the wall 10' of the spool 10, spokes 19 extended from the drum and a collar 20 slidably mounted on the spindle 12 and resiliently held in the position shown in Fig. 2 with a spring 21 whereby arms 22 of the collar are positioned to engage lugs 23 on the upper circular wall 12' of the spool to prevent rotation of the spool in the drum 17.

As illustrated in the drawing the drum 17 is provided with a slot 24 through which the tape 14 extends and the sleeve 18 is provided with slots 25 that are positioned to register with the slot 24.

The end of the tape 14 is provided with a pin 26 that secures the end of the tape between flanges 27 of the fastener 15, and the fastener, which extends from the flanges 27, is provided with arcuate gripping jaws 28 and 29 between which a bead 30 on a plate 31, which is secured to the end of a film or tape 16 with a rivet 32, is held. The bead 30 is adapted to slide longitudinally into the opening between the jaws 28 and 29. The tape 14 extends through the slots 24 and 25 and the opposite end is secured to the cylindrical wall 10' of the spool 10.

Figure 1:
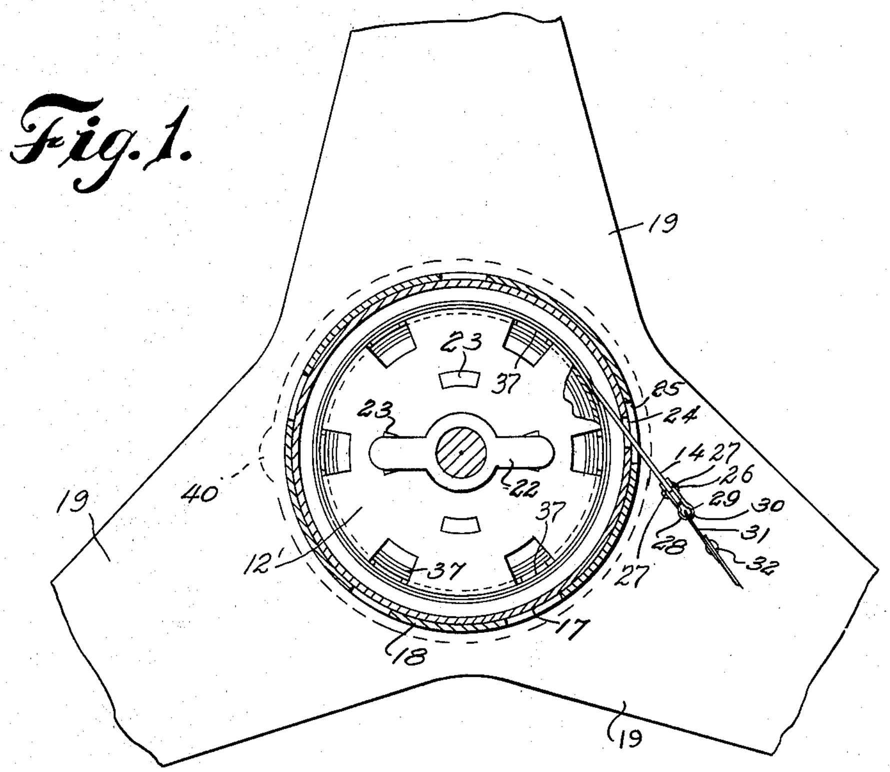
Figure 1 is a longitudinal section through a reel with parts of the spokes of flanges thereof broken away and with an inner auxiliary spool positioned in the drum of the reel shown in elevation except at one point where a part of the auxiliary spool is broken away, said section being taken on line 1—1 of Fig. 2.

One end of the spring 13 is secured to the inner surface of the intermediate cylindrical wall 14' of the spool 10 and the opposite end is secured to a tab 33 extended from a hub 34 mounted on the collar 20 and positioned to engage a disc 35 on the hub 35. The end of the spring 13 is secured to the members 33 with a rivet 36. The lugs 23 are positioned on the disc 35 and the arms 22, which extend from the hub of the collar 20 are positioned to engage the lugs to prevent rotation of the spool 10. The disc 35 is connected to the intermediate cylindrical wall 14' of the spool 10 by flanges 37 struck from openings in the disc 35, as shown in Fig. 1.

The lower circular wall 11 of the spool 10 is provided with an offset section having a flange 38 therein and one end of the spring 21 is positioned in the offset section with the opposite end positioned against the arms 22 of the collar 20 whereby the collar is adapted to be depressed when it is desired to release the spool 10. Upon depressing the collar 20 the arms 22 move away from the lugs 23 and the spool 10 is free to rotate to wind the tape 14.

The upper circular wall 12' of the spool 10 is provided with an annular flange 39 that extends over the surfaces of the side flanges or spokes 19 of the drum 17 and the projection 40 is provided at one side to facilitate assembling the device.

By this means the end of the tape 14 is adapted to be withdrawn from the spool 10, attached to the end of a film or tape and when the tape 14 is released with the collar 20 pressed inwardly the spring 13 winds the tape upon the intermediate wall 14' of the spool 10 with the end of the film or tape held against the surface of the outer sleeve 18 on the drum 17.

Upon release of the collar 20 the spool 10 is locked and the end of the film or tape is secured on the drum. To release the tape or film the collar 20 is pressed inwardly and by drawing on the tape or film the tape 14 may be withdrawn so that the film or tape may be removed therefrom.

It will be understood that modifications, within the scope of the appended claims, may be made in the design and arrangement of the parts without departing from the spirit of the invention.

What is claimed is:

1. A threading reel comprising a drum having extended flanges at the ends, said drum having a transversely disposed slot therein, a spool journaled in the drum, said spool having an intermediate cylindrical wall, a winding spring positioned in said spool within said intermediate wall, a tape mounted on said intermediate wall, said tape extended through the slot in the drum, a fastener positioned on the extended end of the tape for attaching the tape to film and the like, an elongated collar mounted at the center of said drum, a pair of oppositely extending arms carried by each end of said collar, means on said spool engaging the arms on one end of said collar for locking the spool in the drum, and means for releasing the spool to permit rotation of the spool by the winding spring therein.

2. In a film threading reel, the combination which comprises a drum having extended flanges at the ends, and having a transversely disposed slot in the surface thereof, a sleeve having transversely disposed slots therein positioned on said drum, a collar positioned in the center of the drum, a spool mounted on the collar and positioned between the drum and collar, said spool having an intermediate cylinder wall, a winding spring positioned in the spool within the intermediate wall with one end secured to the intermediate wall and the other to the collar, a tape mounted on the intermediate wall of the spool and positioned with one end thereof extended through slots of the drum and sleeve, a film fastener on the extended end of the tape, a pair of oppositely extending arms carried by each end of said collar, radially disposed lugs on said spool alternately engaging the arms on one end of said collar for holding the spool in a fixed position, and the arms on the opposite end of said collar providing means for releasing said first mentioned arms from said lugs to permit rotation of said spool.

References Cited in the file of this patent

UNITED STATES PATENTS

| | | |
|---|---|---|
| 1,923,267 | Howsam | Aug. 22, 1933 |
| 1,945,842 | Witchger | Feb. 6, 1934 |
| 2,080,815 | Gasstrom | May 18, 1937 |
| 2,119,943 | Marks | June 7, 1938 |
| 2,632,609 | Kirby | Mar. 24, 1953 |

UNITED STATES PATENT AND TRADEMARK OFFICE

CERTIFICATE OF CORRECTION

PATENT NO. : 5,742,243

DATED : April 21, 1998

INVENTOR(S) : Yoshiaki MORIYAMA

It is certified that error appears in the above-indentified patent and that said Letters Patent is hereby corrected as shown below:

Title page, item [57],

In Abstract, line 4, change "k," (second occurrence) to --$k_1$--.

In Abstract, line 19, change "10" to --0--.

Column 8, line 39, change "k," (second occurrence) to --$k_1$--.

Column 8, line 40, change "$d<k<k_1$" to -- $d<k\leq k_1$.

Column 8, line 43, change "n every" to --n, every--.

Column 8, line 44, change "m-bits n bits" to --m-bits:n-bits--.

Column 10, line 7, change "000" to --001--.

Column 10, line 9, change "100" to --101--.

Column 10, line 11, change "010-001" to --010-000--.

UNITED STATES PATENT AND TRADEMARK OFFICE
CERTIFICATE OF CORRECTION

PATENT NO. : 5,742,243
DATED : April 21, 1998
INVENTOR(S) : Yoshiaki Moriyama

It is certified that error appears in the above-indentified patent and that said Letters Patent is hereby corrected as shown below:

Column 10, line 13, change "100-001" to --100-000--.

Signed and Sealed this

Nineteenth Day of October, 1999

Attest:

Q. TODD DICKINSON

Attesting Officer

*Acting Commissioner of Patents and Trademarks*